(12) United States Patent
Lee et al.

(10) Patent No.: US 10,171,269 B2
(45) Date of Patent: Jan. 1, 2019

(54) EQUALIZER CIRCUIT AND INTEGRATED CIRCUIT INCLUDING THE SAME

(71) Applicant: Samsung Electronics Co., Ltd., Suwon-si, Gyeonggi-do (KR)

(72) Inventors: Seon-Kyoo Lee, Hwaseong-si (KR); Jeong-Don Ihm, Seongnam-si (KR); Anil Kavala, Yongin-si (KR); Byung-Hoon Jeong, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/099,987

(22) Filed: Apr. 15, 2016

(65) Prior Publication Data

US 2017/0048087 A1 Feb. 16, 2017

(30) Foreign Application Priority Data

Aug. 13, 2015 (KR) .......................... 10-2015-0114325

(51) Int. Cl.
*H04L 25/03* (2006.01)
*H04L 7/00* (2006.01)
*H04L 27/01* (2006.01)

(52) U.S. Cl.
CPC ........ *H04L 25/03019* (2013.01); *H04L 27/01* (2013.01)

(58) Field of Classification Search
CPC ............... H04L 25/03019; H04L 27/01; H04L 25/03885; H04L 7/0087; H04L 7/0331; H04L 25/03267; H04L 25/03878; H04L 25/03025; H04L 2025/03471

USPC .......................................... 375/260; 358/469
See application file for complete search history.

(56) References Cited

U.S. PATENT DOCUMENTS

| 6,097,652 A | 8/2000 | Roh |
| 7,590,173 B2 | 9/2009 | Low et al. |
| 2004/0022143 A1* | 2/2004 | Ho .................... G11B 19/247 369/47.3 |

(Continued)

FOREIGN PATENT DOCUMENTS

| KR | 10-2000-0016862 A | 3/2000 |
| KR | 10-2004-0048181 | 6/2004 |

(Continued)

*Primary Examiner* — Sarah Hassan
(74) *Attorney, Agent, or Firm* — Harness, Dickey & Pierce, PLC

(57) ABSTRACT

An equalizer circuit may include an equalizer controller and a plurality of equalizers. The equalizer controller may prove separate sets of enable signals, delay control signals and voltage control signals to the separate equalizers based on a control signal. The equalizers provide equalizer signals to separate connection nodes between separate pairs of logic circuits. An equalizer may be selectively activated based on a received enable signal. An equalizer may include a delay control circuit and a voltage control circuit. The delay control circuit may delay a received transfer signal to generate a delayed transfer signal based on a received delay control signal. The voltage control circuit may generate an equalizer signal based on the delayed transfer signal and a received voltage control signal. The equalizer circuit may reduce inter-symbol interference in the integrated circuit based on providing the equalizer signals to the connection nodes between the logic circuits.

18 Claims, 12 Drawing Sheets

(56) References Cited

U.S. PATENT DOCUMENTS

| | | | |
|---|---|---|---|
| 2004/0170103 A1 | 9/2004 | Sergey et al. | |
| 2006/0082403 A1* | 4/2006 | Kase | H03K 5/1504 |
| | | | 327/158 |
| 2008/0069183 A1* | 3/2008 | Terada | H04B 1/71635 |
| | | | 375/137 |
| 2011/0026334 A1 | 2/2011 | Bae et al. | |
| 2011/0285432 A1* | 11/2011 | Ozawa | H04L 7/033 |
| | | | 327/149 |
| 2012/0033726 A1* | 2/2012 | Shibasaki | H04L 25/03057 |
| | | | 375/233 |
| 2013/0313714 A1 | 11/2013 | Seok et al. | |
| 2014/0219036 A1* | 8/2014 | Kim | H03K 19/00361 |
| | | | 365/189.02 |

FOREIGN PATENT DOCUMENTS

| | | |
|---|---|---|
| KR | 10-2011-0012805 | 2/2011 |
| KR | 10-1315506 B1 | 10/2013 |
| KR | 10-2013-0130597 | 12/2013 |
| KR | 10-2014-0006459 | 1/2014 |
| KR | 10-2014-0100005 | 8/2014 |

* cited by examiner

EQUALIZER CIRCUIT AND INTEGRATED CIRCUIT INCLUDING THE SAME

CROSS-REFERENCE TO RELATED APPLICATION

This U.S. Non-provisional application claims priority under 35 USC § 119 to Korean Patent Application No. 10-2015-0114325, filed on Aug. 13, 2015, in the Korean Intellectual Property Office (KIPO), the disclosure of which is incorporated by reference in its entirety herein.

BACKGROUND

Example embodiments relate generally to semiconductor integrated circuits, and more particularly to an equalizer circuit and a memory device including the equalizer circuit.

Market demands continue to drive research and development to provide semiconductor memory devices that provide data at faster and faster speeds.

SUMMARY

At least one example embodiment of the present disclosure may provide an equalizer circuit capable of reducing inter-symbol interference (ISI) effect by providing equalizer signals to connection nodes between logic circuits.

At least one example embodiment of the present disclosure may provide a memory device including the equalizer circuit.

According to some example embodiments, an equalizer circuit may include an equalizer controller and at least one equalizer. The equalizer controller may provide an enable signal, a delay control signal and a voltage control signal based on a control signal. The at least one equalizer may provide an equalizer signal based on the enable signal, the delay control signal and the voltage control signal. The at least one equalizer may provide the equalizer signal to a corresponding connection node, the corresponding connection node being connected to a corresponding logic circuit.

The at least one equalizer may include a delay control circuit configured to delay a transfer signal from the corresponding logic circuit to provide a delayed transfer signal based on the delay control signal and a voltage control circuit configured to provide the equalizer signal based on the delayed transfer signal and the voltage control signal.

The delay control circuit may include a plurality of delay control inverters, a PMOS delay control circuit including a plurality of PMOS delay control transistors connected in parallel between a power supply voltage and separate first terminals of the delay control inverters and an NMOS delay control circuit including a plurality of NMOS delay control transistors connected in parallel between a ground voltage and separate second terminals of the delay control inverters.

The PMOS delay control circuit may delay the transfer signal by a delay time based on PMOS delay gate signals applied to gates of the PMOS delay control transistors to selectively activate one or more of the PMOS delay control transistors. The PMOS delay control circuit may control a magnitude of the delay time by controlling a quantity of the PMOS delay control transistors that are activated.

The NMOS delay control circuit may delay the transfer signal by a delay time based on NMOS delay gate signals applied to gates of the NMOS delay control transistors to selectively activate one or more of the NMOS delay control transistors. The NMOS delay control circuit may control a magnitude of the delay time by controlling a quantity of the NMOS delay control transistors that are activated.

The at least one equalizer may be disabled if an entirety of the PMOS delay control transistors and the NMOS delay control transistors included in the at least one equalizer are deactivated.

A quantity of the delay control inverters included in the at least one equalizer may be an even integer.

The voltage control circuit may include a voltage control inverter configured to provide the equalizer signal based on the delayed transfer signal, a PMOS voltage control circuit including a plurality of PMOS voltage control transistors connected in parallel between a power supply voltage and a first terminal of the voltage control inverter and an NMOS voltage control circuit including a plurality of NMOS voltage control transistors connected in parallel between a ground voltage and a second terminal of the voltage control inverter.

The PMOS voltage control circuit may control the equalizer signal based on PMOS voltage gate signals applied to gates of the PMOS voltage control transistors to selectively activate one or more of the PMOS voltage control transistors. The PMOS voltage control circuit may control a voltage of the equalizer signal by controlling a quantity of the PMOS voltage control transistors that are activated.

The NMOS voltage control circuit may control the equalizer signal based on NMOS voltage gate signals applied to gates of the NMOS voltage control transistors to selectively activate one or more of the NMOS voltage control transistors. The NMOS voltage control circuit may control a magnitude of the voltage of the equalizer signal by controlling a quantity of the NMOS voltage control transistors that are activated.

The equalizer circuit may further include a frequency detector that may be configured to detect a frequency of a clock signal and control frequency information included in the control signal based on the frequency of the clock signal.

The equalizer controller may include an information storage configured to store information indicating a value of at least one of the enable signals, the delay control signals and the voltage control signals associated with at least one of a plurality of frequencies of the clock signals.

The equalizer circuit may include a plurality of equalizer circuit. The equalizer controller may control a quantity of the plurality of equalizers that are enabled based on the frequency of the clock signal.

According to some example embodiments, an integrated circuit may include a plurality of logic circuits and an equalizer circuit. The equalizer circuit may include an equalizer controller configured to provide a plurality of signal sets based on a control signal, each signal set including a separate, respective set of enable signals, delay control signals, and voltage control signals and a plurality of equalizers, each of the equalizers being configured to provide a separate equalizer signal based a separate set of enable signals, delay control signals, and voltage control signals, the equalizers being configured to provide the separate equalizer signals to separate, respective connection nodes based on the enable signals, each of the connection nodes being between a separate pair of the logic circuits.

Each of the equalizers may include a delay control circuit configured to delay a transfer signal from a corresponding logic circuit to provide a delayed transfer signal, the delay control circuit configured to delay the transfer signal based on a delay control signal and a voltage control circuit configured to provide an equalizer signal based on the delayed transfer signal and a voltage control signal.

The equalizer circuit according to some example embodiments may reduce the ISI effect by providing the equalizer signals to the connection nodes between the logic circuits based on the control signals.

According to some example embodiments, an equalizer may include a delay control circuit and a voltage control circuit. The delay control circuit may be configured to delay a received transfer signal to generate a delayed transfer signal. The delay control circuit may be configured to delay the transfer signal based on a delay control signal. The voltage control circuit may be configured to generate an equalizer signal based on the delayed transfer signal and a received voltage control signal.

In some example embodiments, the delay control circuit may include a plurality of delay control inverters, a PMOS delay control circuit, and an NMOS delay control circuit. Each of the delay control inverters may include a first terminal and a second terminal. The PMOS delay control circuit may include a plurality of PMOS delay control transistors. Each of the PMOS delay control transistors may be connected in parallel between a power supply voltage and separate first terminals of the plurality of delay control inverters. The NMOS delay control circuit may include a plurality of NMOS delay control transistors, each of the NMOS delay control transistors being connected in parallel between a ground voltage and separate second terminals of the plurality of delay control inverters.

In some example embodiments, the PMOS delay control circuit may be configured to delay the transfer signal by a delay time based on PMOS delay gate signals applied to gates of the PMOS delay control transistors; to selectively activate one or more of the PMOS delay control transistors. The PMOS delay control circuit may be configured to control a magnitude of the delay time by controlling a quantity of the PMOS delay control transistors that are activated.

In some example embodiments, the NMOS delay control circuit may be configured to delay the transfer signal by a delay time based on NMOS delay gate signals applied to gates of the NMOS delay control transistors to selectively activate one or more of the NMOS delay control transistors. The NMOS delay control circuit may be configured to control a magnitude of the delay time by controlling a quantity of the NMOS delay control transistors that are activated.

In some example embodiments, the voltage control circuit may include a voltage control inverter, a PMOS voltage control circuit, and an NMOS voltage control circuit. The voltage control inverter may be configured to provide the equalizer signal based on the delayed transfer signal. The PMOS voltage control circuit may include a plurality of PMOS voltage control transistors, each of the PMOS voltage control transistors being connected in parallel between a power supply voltage and a first terminal of the voltage control inverter. The NMOS voltage control circuit may include a plurality of NMOS voltage control transistors, each of the NMOS voltage control transistors being connected in parallel between a ground voltage and a second terminal of the voltage control inverter.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
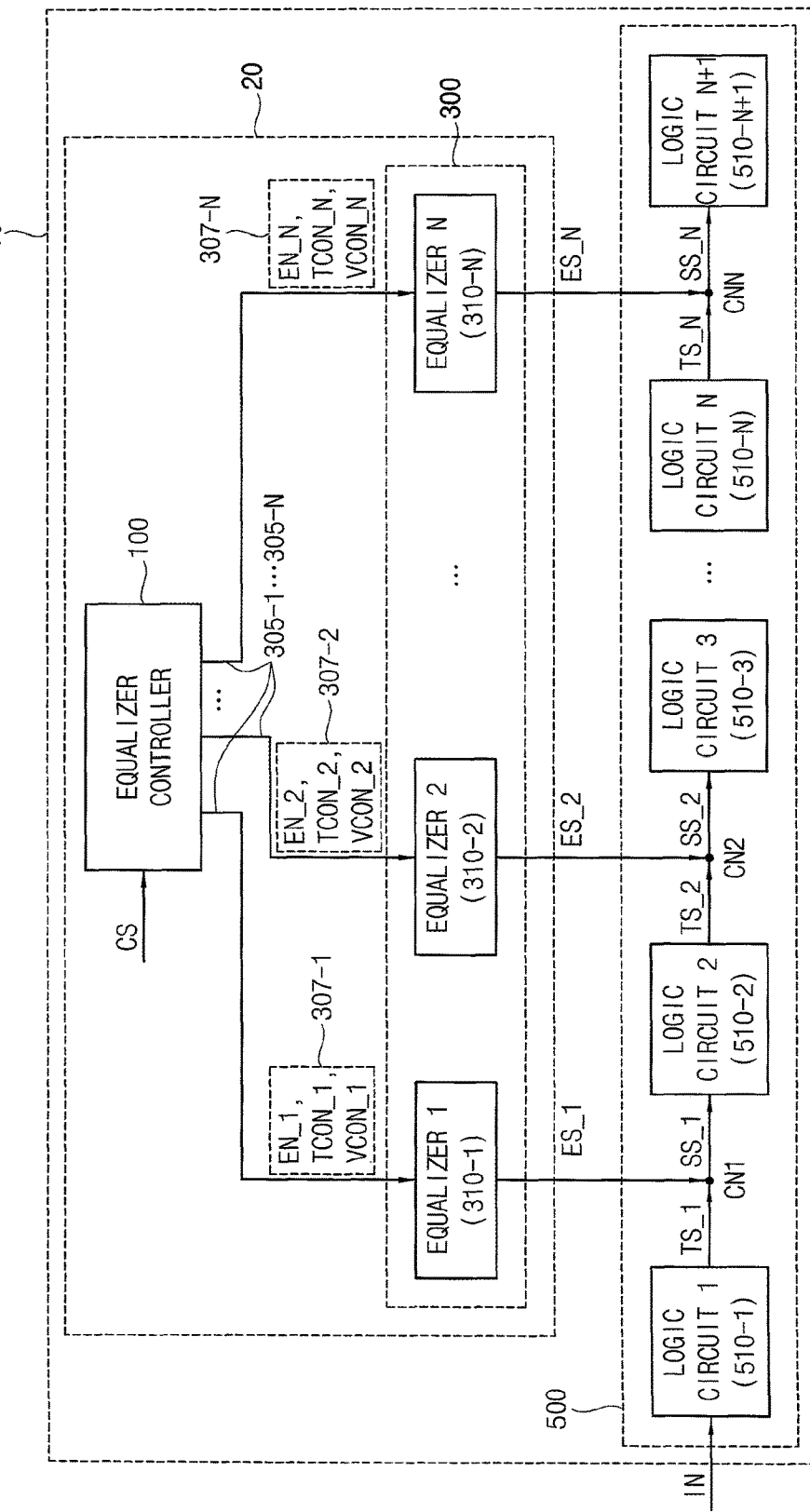
FIG. 1 is a block diagram illustrating an integrated circuit including an equalizer circuit according to some example embodiments.

It should be noted that these figures are intended to illustrate the general characteristics of methods and/or structure utilized in some example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE EMBODIMENTS

Various example embodiments will be described more fully hereinafter with reference to the accompanying drawings, in which some example embodiments are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), an application-specific integrated circuit (ASIC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a block diagram illustrating an integrated circuit including an equalizer circuit according to some example embodiments.

Referring to FIG. 1, an integrated circuit 10 includes an equalizer circuit 20 and a plurality 500 of logic circuits 510-1 to 510-N, where "N" is a positive integer. The equalizer circuit 20 includes an equalizer controller 100 and a plurality 300 of equalizers 310-1 to 310-N. The controller 100 may include a computer processing device. The controller 100 may be included in a computer processing device.

The equalizer controller 100 may be configured to send separate sets of signals to separate equalizers 310-1 to 310-N on corresponding signal lines 305-1 to 305-N. The equalizer controller 100 may provide a plurality of enable signals EN_1 to EN_N, a plurality of delay control signals TCON_1 to TCON_N and a plurality of voltage control signals VCON_1 to VCON_N on separate signal lines 305-1 to 305-N, based on a control signal CS. For example, the enable signals EN_1 to EN_N may include a first enable signal EN_1 through an N-th enable signal EN_N, the delay control signals TCON_1 to TCON_N may include a first delay control signal TCON_1 through an N-th delay control signal TCON_N, and the voltage control signals VCON_1 to VCON_N may include a first voltage control signal VCON_1 through an N-th voltage control signal VCON_N. Signals EN_1, TCON_1, and VCON_1 may be communicated to equalizer 310-1 on signal line 305-1, signals EN_2, TCON_2, and VCON_2 may be communicated to equalizer 310-2 on signal line 305-2, and EN_N, TCON_N, and VCON_N may be communicated to equalizer 310-N on signal line 305-N.

Signals communicated to separate equalizers 310-1 to 310-N on separate signal lines 305-1 to 307-N may be referred to herein as separate signal sets 307-1 to 307-N. For example, signal set 307-1 may include one or more of EN_1, TCON_1, and VCON_1, signal set 307-2 may include one or more of EN_2, TCON_2, and VCON_2, and signal set 307-N may include one or more of EN_N, TCON_N, and VCON_N.

In some example embodiments, as will be described with reference to FIG. 10, the control signal CS may be provided from a control logic circuit 40 in the memory device. The equalizer controller 100 may generate one or more of the enable signals EN_1 to EN_N, the delay control signals TCON_1 to TCON_N and the voltage control signals VCON_1 to VCON_N based on the control signal CS from the control logic circuit 40.

In some example embodiments, an equalizer may be selectively enabled (i.e., "turned on or off," "selectively activated," etc.) based on an enable signal provided to the equalizer. For example, to enable an equalizer 310-1, the equalizer controller 100 may activate (i.e., "provide," "generate," etc.) an enable signal EN_1 to the equalizer 310-1.

In some example embodiments, the control signal CS corresponds to 100 MHz. The equalizer controller 100 may activate the first enable signal EN_1 and deactivate the second enable signal EN_2 in response to the control signal CS corresponding to 100 MHz. The first equalizer 310-1 may be enabled in response to the activated first enable signal EN_1 and the second equalizer 310-2 may be disabled in response to the deactivated second enable signal EN_2. The enabled first equalizer 310-1 may operate based on the first delay control signal TCON_1 and the first voltage control signal VCON_1. The disabled second equalizer 310-2 may not operate based the second delay control signal TCON_2 and the second voltage control signal VCON_2.

In some example embodiments, the control signal CS corresponds to 200 MHz. The equalizer controller 100 may activate both of the first enable signal EN_1 and the second enable signal EN_2 in response to the control signal CS corresponding to 200 MHz. The first equalizer 310-1 may be enabled in response to the activated first enable signal EN_1 and the second equalizer 310-2 may be enabled in response to the activated second enable signal EN_2. The enabled first equalizer 310-1 may operate based on the first delay control signal TCON_1 and the first voltage control signal VCON_1. The enabled second equalizer 310-2 may operate based the second delay control signal TCON_2 and the second voltage control signal VCON_2.

As such, the number of the equalizers that are enabled may be varied depending on the frequency to which the control signal CS corresponds. For example, the number of the equalizers 310-1 to 310-N that are enabled may be increased as the frequency to which the control signal CS corresponds increases and the number of the equalizers that are enabled is decreased as the frequency to which the control signal CS corresponds decreases.

Each of the equalizers 310-1 to 310-N may generate separate equalizer signals ES_1 to ES_N to separate connection nodes CN1 to CNN based on the separate sets of signals 307-1 to 307-N. Each separate connection node CN1 to CNN is between a separate pair of the logic circuits 500. For example, the equalizers 300 may include first through N-th equalizers 310-1 to 310-N, and the logic circuits 500 may include first through (N+1)-th logic circuits 510, 510-2, 510-3, 510-N and 510-(N+1). The first equalizer 310-1 may be enabled in response to the first enable signal EN_1 of the first signal set 307-1. When the first equalizer 310-1 is enabled in response to the first enable signal EN_1, the first equalizer 310-1 may provide the first equalizer signal ES_1 to the first connection node CN1 between the first logic circuit 510-1 and the second logic circuit 510-2 based on the first delay control signal TCON_1 and the first voltage control signal VCON_1 of the first signal set 307-1. The second equalizer 310-2 may be enabled in response to the second enable signal EN of the second signal set 307-2. When the second equalizer 310-2 is enabled in response to the second enable signal EN_2, the second equalizer 310-2 may provide the second equalizer signal ES_2 to the second connection node CN2 between the second logic circuit 510-2 and the third logic circuit 510-3 based on the second delay control signal TCON_2 and the second voltage control signal VCON_2 of the second signal set 307-2. In the same way, the N-th equalizer 310-N may be enabled in response to the N-th enable signal EN_N of the Nth signal set 307-N. When the N-th equalizer 310-N is enabled in response to the N-th enable signal EN_N, the N-th equalizer 310-N may provide the N-th equalizer signal ES_N to the N-th connection node CNN between the N-th logic circuit 510-N and the (N+1)-th logic circuit 510-(N+1) based on the N-th delay control signal TCON_N and the N-th voltage control signal VCON_N of the Nth signal set 307-N.

The equalizer circuit 20 according to some example embodiments may reduce the ISI effect by providing the equalizer signals ES_1 to ES_N to the connection nodes CN1 to CNN between separate pairs of the logic circuits 500 based on the enable signals EN_1 to EN_N, the delay control signals TCON_1 to TCON_N and the voltage control signals VCON_1 to VCON_N of separate signal sets 307-1 to 307-N, where signals of each separate signal set 307-1 to 307-N are provided to separate, respective equalizers 310-1 to 310-N.

Figure 2:
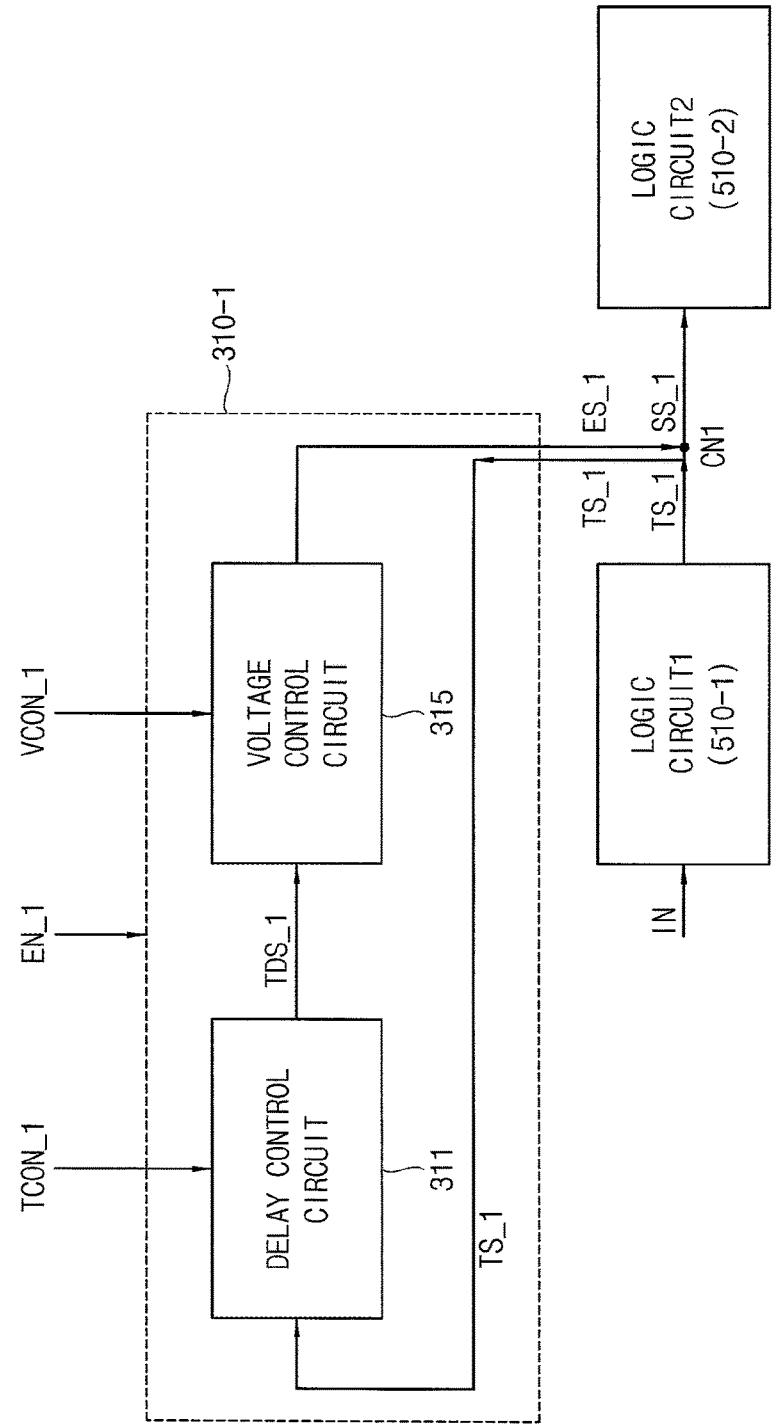
FIG. 2 is a block diagram illustrating an example embodiment of an equalizer included in the integrated circuit of FIG. 1.
Figure 3:
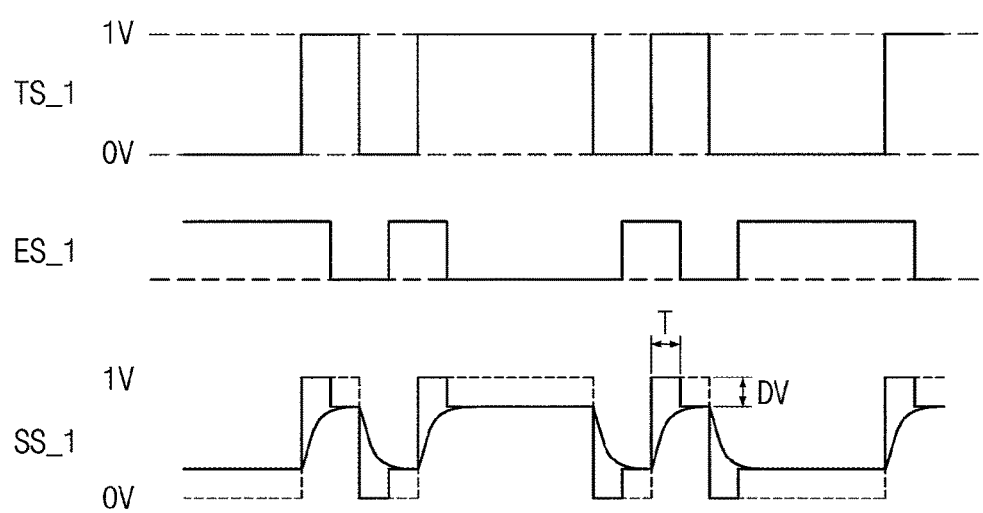
FIG. 3 is a timing diagram for describing an operation of the equalizer of FIG. 2.

FIG. 2 is a block diagram illustrating an example embodiment of an equalizer 310-1 included in the integrated circuit of FIG. 1, and FIG. 3 is a timing diagram for describing an operation of the equalizer 310-1 of FIG. 2.

FIG. 2 illustrates the first equalizer 310-1 as an example and the other equalizers 310-2 and 310-N in the integrated circuit 10 of FIG. 1 may have substantially the same configuration.

Referring to FIG. 2, each of the equalizers 310-1 to 310-N may include a delay control circuit 311 and a voltage control circuit 315. The delay control circuit 311 may delay a transfer signal TS from a corresponding logic circuit 510-1 to 510-N of the plurality of logic circuits 500 based on a corresponding delay control signal TCON of a signal set 307-1 to 307-N communicated to the respective equalizer 310-1 to 310-N. The delay control circuit 311 may delay a transfer circuit from the corresponding logic circuit 510-1 to 510-N to provide a corresponding delayed transfer signal TDS_1 to TDS_N. The voltage control circuit 315 may provide the corresponding equalizer signal ES_1 to ES_N based on the delayed transfer signal TDS_1 to TDS_N and the corresponding voltage control signal VCON_1 to VCON_N. The equalizer 310-1 may be selectively enabled based on the enable signal EN_1.

In the example embodiment illustrated in FIG. 2, the first equalizer 310-1 includes a first delay control circuit 311 and a first voltage control circuit 315. The first logic circuit 510-1 receives an input signal IN and outputs a first transfer signal TS_1, and the first transfer signal TS_1 is provided to the first delay control circuit 311. The first delay control circuit 311 delays the first transfer signal TS_1 from the first logic circuit 510-1 based on the first delay control signal TCON_1 to provide a first delayed transfer signal TDS_1. The delay time T of the first delay control circuit 311 may be determined based on the first delay control signal TCON_1. The first delayed transfer signal TDS_1 may be provided to the first voltage control circuit 315 of the first equalizer 310-1. The first voltage control circuit 315 may provide the first equalizer signal ES_1 based on the first delayed transfer signal TDS_1 and the first voltage control signal VCON_1.

In the example embodiment illustrated in FIG. 3, the first transfer signal has a logic high level of 1V and a logic low level of 0V. The first equalizer signal ES_1 may be an inverted and delayed signal with respect to the first transfer signal TS_1, and thus the number of inverters included in the first equalizer 310-1 may be 2K+1 where K is a positive integer. The voltage levels of the first equalizer signal ES_1 may be determined variously according to voltages provided to the first equalizer 310. For example, the first delay control circuit 311 in the first equalizer 310-1 may include 2K inverters and the first voltage control circuit 315 in the first equalizer 310-1 may include one inverter. As used herein, a "voltage level" of a signal will be understood to refer to a magnitude of a voltage of the signal.

A first sum signal SS_1 may be transferred to the second logic circuit 510-2 from the first connection node CN1. When the first transfer signal TS_1 is 0V and the first equalizer signal ES_1 is the logic high level, the first sum signal SS_1 may have a voltage level between 0V and 1V. As the first equalizer signal ES_1 is weak, the first sum signal SS_1 may be near 0V. When the first transfer signal TS_1 is 1V and the first equalizer signal ES_1 is the logic high level, the first sum signal SS_1 may have the voltage level of 1V. When the first transfer signal TS_1 is 1V and the first equalizer signal ES_1 is the logic low level, the first sum signal SS_1 may have the voltage level between 0V and 1V. As the first equalizer signal ES_1 is weak, the first sum signal SS_1 may be near 1V. When the first transfer signal TS_1 is 0V and the first equalizer signal ES_1 is the logic low level, the first sum signal SS_1 may have the voltage level of 0V.

A delta voltage DV in FIG. 3 may be varied depending on the voltage levels of the first transfer signal TS_1 and the first equalizer signal ES_1. The delta voltage DV may be decreased as a difference of the voltage levels of the first transfer signal TS_1 and the first equalizer signal ES_1 is decreased. The delta voltage DV may be increased as the difference of the voltage levels of the first transfer signal TS_1 and the first equalizer signal ES_1 is increased.

The first sum signal SS_1, which is generated by combining the first transfer signal TS_1 and the first equalizer signal ES_1, may have more high-frequency components than the first transfer signal TS_1. The ISI effect may be reduced by transferring the first sum signal SS_1 through the conduction path.

As such, the equalizer circuit 20 according to some example embodiments may reduce the ISI effect by providing the equalizer signals ES_1 to ES_N to corresponding connection nodes CN1 to CNN between the logic circuits 510-1 to 510-N based on the corresponding signal sets 307-1 to 307-N.

Figure 4:
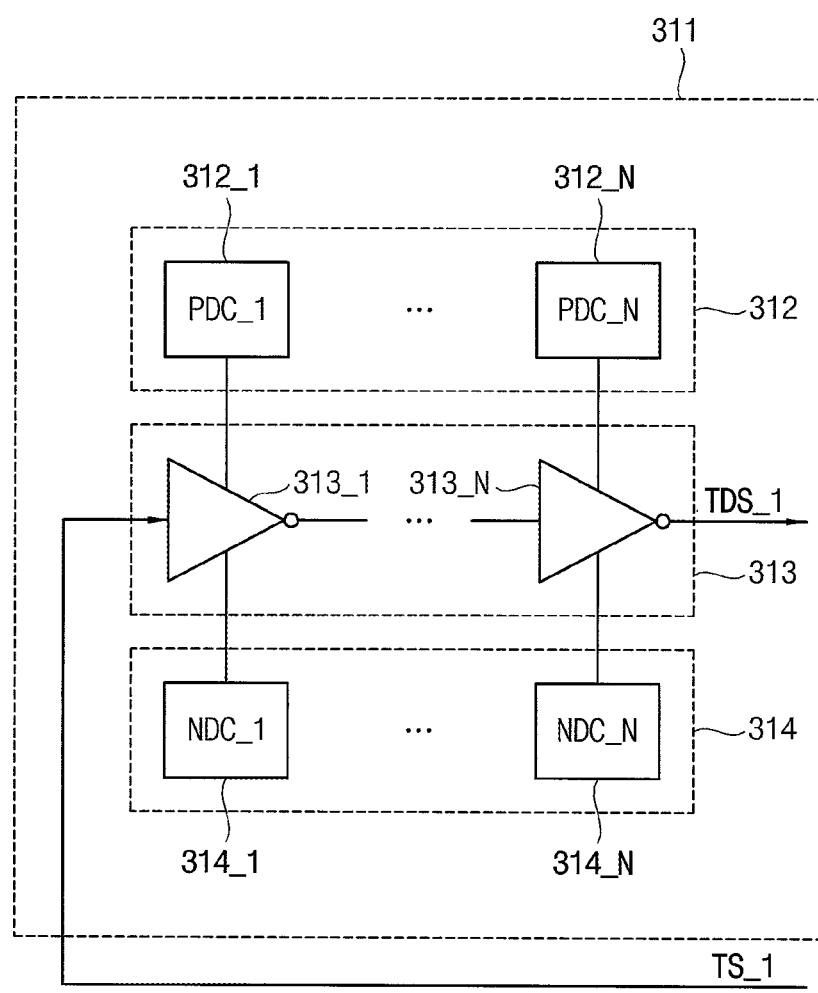
FIG. 4 is a diagram illustrating an example embodiment of a delay control circuit included in the equalizer of FIG. 2.
Figure 5:
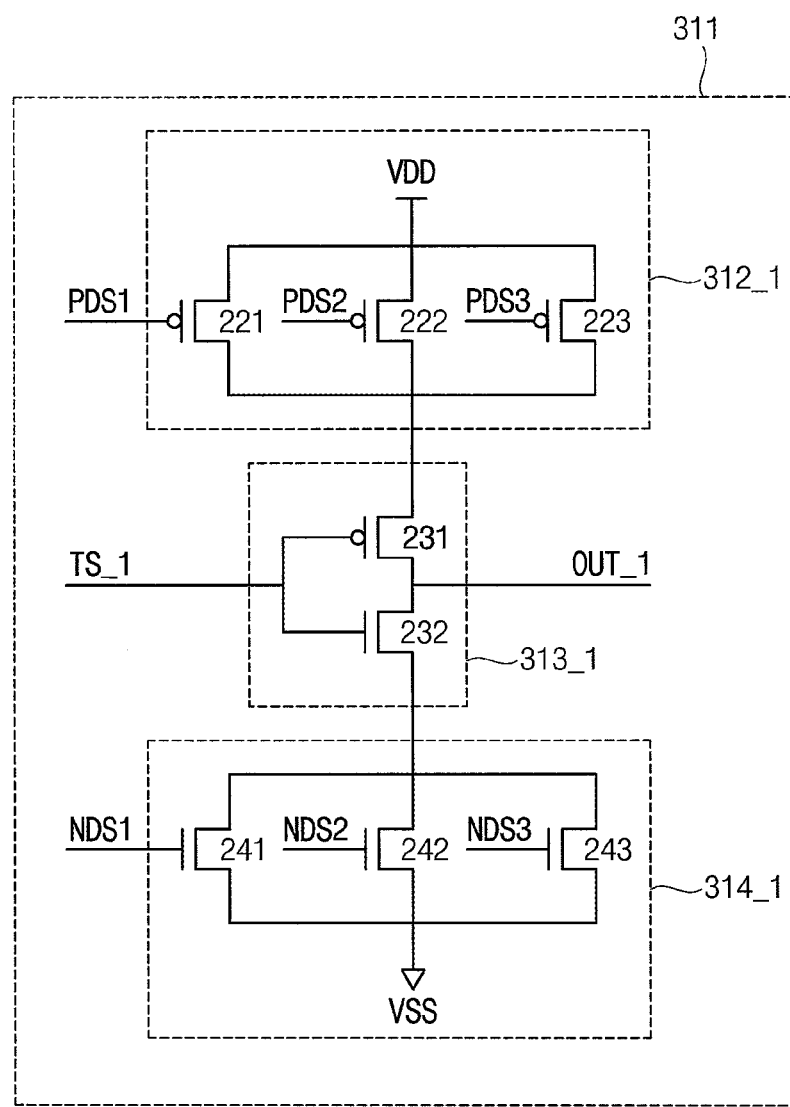
FIG. 5 is a circuit diagram illustrating a delay control unit included in the delay control circuit of FIG. 4.

FIG. 4 is a diagram illustrating an example embodiment of a delay control circuit 311 included in the equalizer 310-1 of FIG. 2, and FIG. 5 is a circuit diagram illustrating a delay control unit included in the delay control circuit 311 of FIG. 4.

Referring to FIGS. 4 and 5, a delay control circuit 311 may include a plurality 313 of delay control inverters 313_1 to 313_N, a PMOS delay control circuit 312, and an NMOS delay control circuit 314. The delay control inverters 313 may include a first control inverter 313_1 through an N-th delay control inverter 313_N. Each of the delay control inverters 313_1 to 313_N may include a PMOS transistor 231 and an NMOS transistor 232, as illustrated in FIG. 5.

The PMOS delay control circuit 312 may include first through N-th PMOS delay control circuits PDC_1 to PDC_N (312_1 to 312_N). Each of the first through N-th PMOS delay control circuits 312_1 to 312_N may include a separate plurality of PMOS delay control transistors connected in parallel between a power supply voltage VDD and a first terminal of a separate one of the delay control inverters 313_1 to 313_N. For example, the first PMOS delay control circuit 312_1 may include first, second and third PMOS delay control transistors 221, 222 and 223. The transistors 221, 222, and 223 are connected in parallel between the power supply voltage VDD and the first terminal of the first delay control inverter 313_1, as illustrated in FIG. 5.

The NMOS delay control circuit 314 may include first through N-th NMOS delay control circuits NDC_1 to NDC_N (314_1 to 314_N). Each of the first through N-th NMOS delay control circuits 314_1 to 314_N includes a separate plurality of NMOS delay control transistors connected in parallel between a ground voltage VSS and a second terminal of a separate one of the delay control inverters 313_1 to 313_N. For example, the first NMOS delay control circuit 314_1 may include first, second and third NMOS delay control transistors 241, 242 and 243. The transistors 241, 242, and 243 are connected in parallel between the ground voltage VSS and the second terminal of the first delay control inverter 313_1, as illustrated in FIG. 5.

The PMOS delay control circuit 312 may delay the transfer signal TS by the delay time T based on PMOS delay gate signals PDS applied to gates of one or more of the PMOS delay control transistors of the PMOS delay control circuits 312_1 to 312_N to selectively activate ("turn on") the one or more PMOS delay control transistors. For example, the first PMOS delay gate signal PDS1 may be applied to the gate of the first PMOS delay control transistor 221, the second PMOS delay gate signal PDS2 may be applied to the gate of the second PMOS delay control transistor 222 and the third PMOS delay gate signal PDS3 may be applied to the gate of the third PMOS delay control transistor 223. The first, second and third PMOS delay gate signals PDS1, PDS2 and PDS3 may be included in the first delay control signal TCON_1. Thus, the PMOS delay control circuit 312 may be configured to selectively activate one or more of the PMOS delay control transistors 221, 222, 223 based on the first delay control signal TCON_1.

In some example embodiments, the magnitude of the delay time T may be decreased as the number ("quantity") of the PMOS delay control transistors that are turned on is increased, and the magnitude of the delay time T may be increased as the number ("quantity") of the PMOS delay control transistors that are turned on is decreased. The delay time T may be controlled based on one or more PMOS delay gate signals applied to gates of one or more PMOS delay control transistors 221, 222, 223.

For example, the first PMOS delay gate signal PDS1 may be the logic low level, and the second and third PMOS delay gate signals PDS2 and PDS3 may be the logic high level. In this case, the first PMOS delay control transistor 221 may be turned on and the second and third PMOS delay control transistors 222 and 223 may be turned off. Thus the number of the PMOS delay control transistors that are turned on may be one.

For example, the first and second PMOS delay gate signals PDS1 and PDS2 may be the logic low level, and the third PMOS delay gate signal PDS3 may be the logic high level. In this case, the first and second PMOS delay control transistors 221 and 222 may be turned on and the third PMOS delay control transistor 223 may be turned off. Thus the number of the PMOS delay control transistors that are turned on may be two.

When the number of the PMOS delay control transistors that are turned on is increased from one to two, the first delay control inverter 313_1 may provide output OUT_1 more rapidly. In this case, the delay time T of the delay control circuit 311 may be decreased. In contrast, when the number of the PMOS delay control transistors that are turned on is decreased from two to one, the first delay control inverter 313_1 may provide output OUT_1 more slowly. In this case, the delay time T of the delay control circuit 311 may be increased.

The NMOS delay control circuit 314 may delay the transfer signal TS by a delay time T based on NMOS delay gate signals NDS applied to gates of the NMOS delay control transistors. For example, the first NMOS delay gate signal NDS1 may be applied to the gate of the first NMOS delay control transistor 241, the second NMOS delay gate signal NDS2 may be applied to the gate of the second NMOS delay control transistor 242 and the third NMOS delay gate signal NDS3 may be applied to the gate of the third NMOS delay control transistor 243. The first, second and third NMOS delay gate signals NDS1, NDS2 and NDS3 may be included in the first delay control signal TCON_1. Thus, the NMOS delay control circuit 314 may be configured to selectively activate one or more of the NMOS delay control transistors 241, 242, 243 based on the first delay control signal TCON_1.

In some example embodiments, the magnitude of the delay time T may be decreased as the number ("quantity") of the NMOS delay control transistors that are turned on is increased, and the magnitude of the delay time T may be increased as the number ("quantity") of the NMOS delay control transistors that are turned on is decreased. The magnitude of the delay time T may be controlled based on one or more NMOS delay gate signals applied to gates of one or more NMOS delay control transistors 241, 242, 243.

For example, the first NMOS delay gate signal NDS1 may be the logic high level, and the second and third NMOS delay gate signals NDS2 and NDS3 may be the logic low level. The first NMOS delay control transistor 241 may be turned on and the second and third NMOS delay control transistors 242 and 243 may be turned off. Thus the number of the NMOS delay control transistors that are turned on may be one.

In another example, the first and second NMOS delay gate signals NDS1 and NDS2 may be the logic high level, and the third NMOS delay gate signal NDS3 may be the logic low level. In this case, the first and second NMOS delay control transistors 241 and 242 may be turned on and the third NMOS delay control transistor 243 may be turned off. Thus the number of the NMOS delay control transistors that are turned on may be two.

If and/or when the number of the NMOS delay control transistors that are turned on is increased from one to two, the first delay control inverter 313_1 may provide output OUT_1 more rapidly. In this case, the delay time T of the delay control circuit 311 may be decreased. In contrast, when the number of the NMOS delay control transistors that are turned on is decreased from two to one, the first delay control inverter 313_1 may provide output OUT_1 more slowly. In this case, the delay time T of the delay control circuit 311 may be increased.

In some example embodiments, an equalizer 310-1 to 310-N may be disabled when all of the PMOS delay control transistors 221, 222, 223 of at least one of the PMOS delay control circuits 312_1 to 312_N and the NMOS delay control transistors 241, 242, 243 of at least one of the NMOS delay control circuits 314_1 to 314_N in the equalizer are turned off ("deactivated"). For example, the first PMOS delay control circuit 312_1 may include the first, second and third PMOS delay control transistors 221, 222 and 223, and the first NMOS delay control circuit 314_1 may include the first, second and third NMOS delay control transistors 241, 242 and 243. When all of the first, second and third PMOS delay gate signals PDS1, PDS2 and PDS3 are the logic high level and the all of the first, second and third NMOS delay gate signals NDS1, NDS2 and NDS3 are the logic low level, all of the first, second and third PMOS delay control transistors 221, 222 and 223 and the first, second and third NMOS delay control transistors 241, 242 and 243 may be turned off. As a result, the first delay control inverter 313_1 may be disabled.

Figure 6:
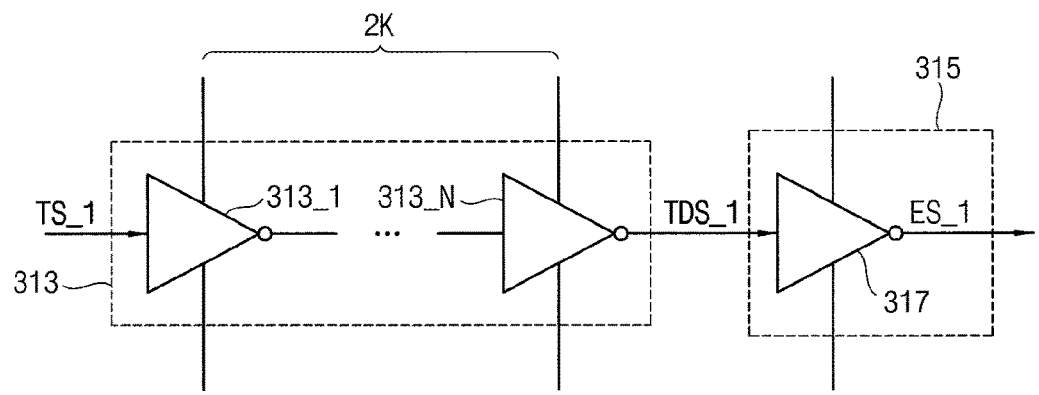
FIG. 6 is a diagram for describing the number of inverters included in the equalizer of FIG. 2.

FIG. 6 is a diagram for describing the number of inverters included in the equalizer 310-1 of FIG. 2.

As described with reference to FIG. 3, the first transfer signal TS1_1 may be input to the first delay control circuit 311, and the first delay control circuit 311 may delay the first transfer signal TS_1 and provide the first delayed transfer signal TDS_1. The first delayed transfer signal TDS_1 is input to the first voltage control circuit 315. The first voltage control circuit 315 may generate the first equalizer signal ES_1 based on the first delayed transfer signal TDS_1.

The first equalizer signal ES_1 may be an inverted and delayed signal with respect to the first transfer signal TS_1. The number of inverters included in the first equalizer 310-1 may be 2K+1 where K is a positive integer. For example, the first delay control circuit 311 in the first equalizer 310-1 may include 2K inverters 313_1 to 313_N and the first voltage control circuit 315 in the first equalizer 310-1 may include one inverter 317 as illustrated in FIG. 6. As such, the delay control inverters 313_1 to 313_N of an even number 2K may be included in each of the equalizers 300.

Figure 7:
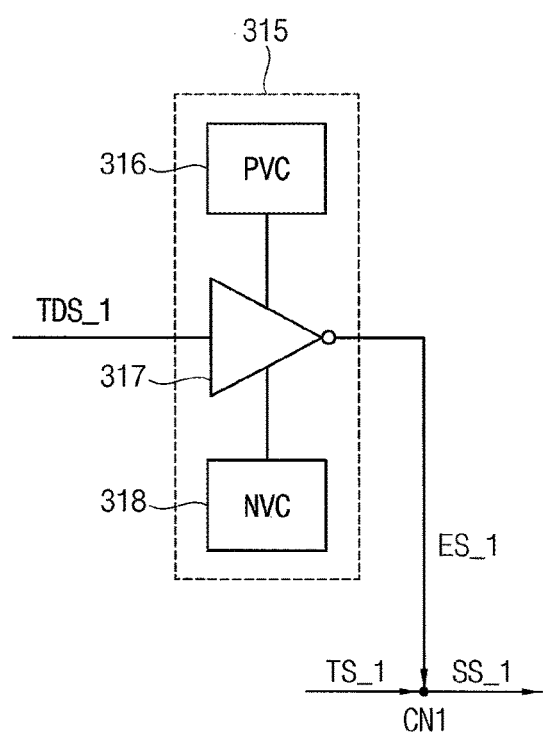
FIG. 7 and FIG. 8 are diagrams illustrating an example of a voltage control circuit included in the equalizer of FIG. 2.
Figure 8:
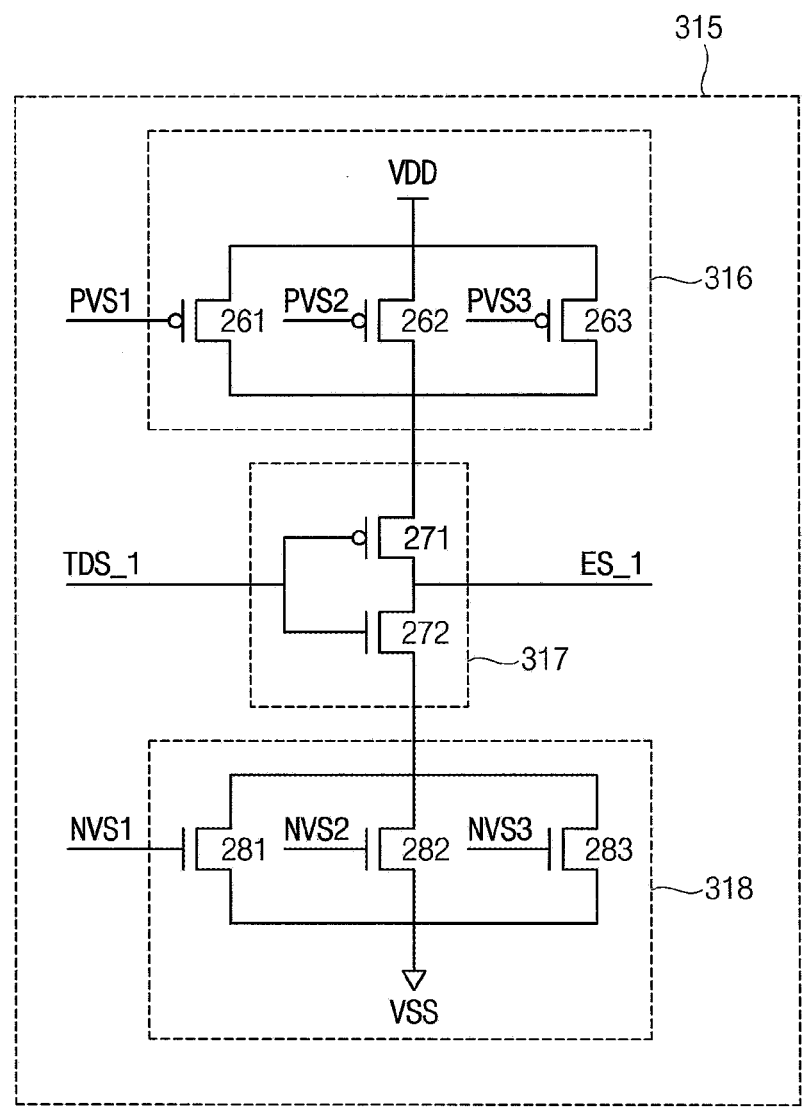

FIG. 7 and FIG. 8 are diagrams illustrating an example of a voltage control circuit 315 included in the equalizer of FIG. 2.

Referring to FIG. 7 and FIG. 8, a voltage control circuit 315 may include a voltage control inverter 317, a PMOS voltage control circuit PVC 316 and an NMOS voltage control circuit NVC 318.

The voltage control inverter 315 of a given equalizer 310-1 to 310-N may provide a corresponding equalizer signal ES_1 to ES_N based on the corresponding delayed transfer signal TDS_1 to TDS_N. For example, the first voltage control inverter 315 in the first equalizer 310-1 may provide the first equalizer signal ES_1 based on the first delayed transfer signal TDS_1 from the first delay control circuit 311 in the first equalizer 310-1. The voltage inverter 317 may include a PMOS transistor 271 and an NMOS transistor 272 as illustrated in FIG. 8.

The PMOS voltage control circuit 316 may include a plurality of PMOS voltage control transistors connected in parallel between a power supply voltage VDD and a first terminal of the voltage control inverter 317. For example, the PMOS voltage control circuit 316 may include first, second and third PMOS voltage control transistors 261, 262 and 263 connected in parallel between the power supply voltage VDD and the first terminal of the voltage control inverter 317, as illustrated in FIG. 8.

The NMOS voltage control circuit 318 may include a plurality of NMOS voltage control transistors connected in parallel between a ground voltage VSS and a second terminal of the voltage control inverter 317. For example, the NMOS voltage control circuit 318 may include first, second and third NMOS voltage control transistors 281, 282 and 283 connected in parallel between the ground voltage VSS and the second terminal of the voltage control inverter 317, as illustrated in FIG. 8.

The PMOS voltage control circuit 316 may control the equalizer signal ES based on PMOS voltage gate signals PVS applied to gates of the PMOS voltage control transistors. For example, the PMOS voltage control circuit 316 in the first equalizer 310-1 may control the first equalizer signal ES_1 based on first, second and third PMOS voltage gate signals PVS1, PVS2 and PVS3. The first PMOS voltage gate signal PVS1 may be applied to the gate of the first PMOS voltage control transistor 261, the second PMOS voltage gate signal PVS2 may be applied to the gate of the second PMOS voltage control transistor 262, and the third PMOS voltage gate signal PVS3 may be applied to the gate of the third PMOS voltage control transistor 263. The first, second and third PMOS voltage gate signals PVS1, PVS2 and PVS3 may be included in the first voltage control signal VCON_1. Thus, the PMOS voltage control circuit 316 may be configured to selectively activate one or more of the PMOS voltage control transistors 261, 262, 263 based on the first voltage control signal VCON_1.

Controlling an equalizer signal ES may include controlling a voltage of the equalizer signal ES. In some example embodiments, a magnitude of the voltage ("voltage level") of the first equalizer signal ES_1 may be increased as a number ("quantity") of the PMOS voltage control transistors that are turned on is increased, and the magnitude of the voltage ("voltage level") of the first equalizer signal ES_1 may be decreased as the number ("quantity") of the PMOS voltage control transistors that are turned on is decreased. The magnitude of the voltage of the first equalizer signal ES_1 may be controlled based on one or more PMOS voltage gate signals applied to gates of one or more PMOS voltage control transistors 261, 262, 263.

For example, the first PMOS voltage gate signal PVS1 may be the logic low level, and the second and third PMOS voltage gate signals PVS2 and PVS3 may be the logic high level. In this case, the first PMOS voltage control transistor 261 may be turned on and the second and third PMOS voltage control transistors 262 and 263 may be turned off. Thus the number of the PMOS voltage control transistors that are turned on may be one.

For example, the first and second PMOS voltage gate signals PVS1 and PVS2 may be the logic low level, and the third PMOS voltage gate signal PVS3 may be the logic high level. In this case, the first and second PMOS voltage control transistors 261 and 262 may be turned on and the third PMOS voltage control transistor 263 may be turned off. Thus the number of the PMOS voltage control transistors that are turned on may be two.

When the number of the PMOS voltage control transistors that are turned on is increased from one to two, the voltage level of the first equalizer signal ES_1 may be increased. In contrast, when the number of the PMOS voltage control transistors that are turned on is decreased from two to one, the voltage level of the first equalizer signal ES_1 may be decreased. The delta voltage DV in FIG. 3 may be varied depending on a difference between the voltage levels of the first transfer signal TS_1 and the first equalizer signal ES_1.

The NMOS voltage control circuit 318 may control the equalizer signal ES based on NMOS voltage gate signals NVS applied to gates of the NMOS voltage control transistors. For example, the NMOS voltage control circuit 318 in the first equalizer 310-1 may control the first equalizer signal ES_1 based on first, second and third NMOS voltage gate signals NVS1, NVS2 and NVS3. The first NMOS voltage gate signal NVS1 may be applied to the gate of the first NMOS voltage control transistor 281, the second NMOS voltage gate signal NVS2 may be applied to the gate of the second NMOS voltage control transistor 282, and the third NMOS voltage gate signal NVS3 may be applied to the gate of the third NMOS voltage control transistor 283. The first, second and third NMOS voltage gate signals NVS1, NVS2 and NVS3 may be included in the first voltage control signal VCON_1. Thus, the NMOS voltage control circuit 318 may be configured to selectively activate one or more of the NMOS voltage control transistors 281, 282, 283 based on the first voltage control signal VCON_1.

In some example embodiments, the magnitude of the voltage ("voltage level") of the first equalizer signal ES_1 may be increased as a number ("quantity") of the NMOS voltage control transistors that are turned on is increased, and the magnitude of the voltage ("voltage level") of the first equalizer signal ES_1 may be decreased as the number ("quantity") of the NMOS voltage control transistors that are turned on is decreased. The operation of the NMOS voltage control circuit 318 is similar to the operation of the PMOS voltage control circuit 316 and the repeated descriptions are omitted. The magnitude of the voltage of the first equalizer signal ES_1 may be controlled based on one or more NMOS voltage gate signals applied to gates of one or more NMOS voltage control transistors 281, 282, 283.

Figure 9:
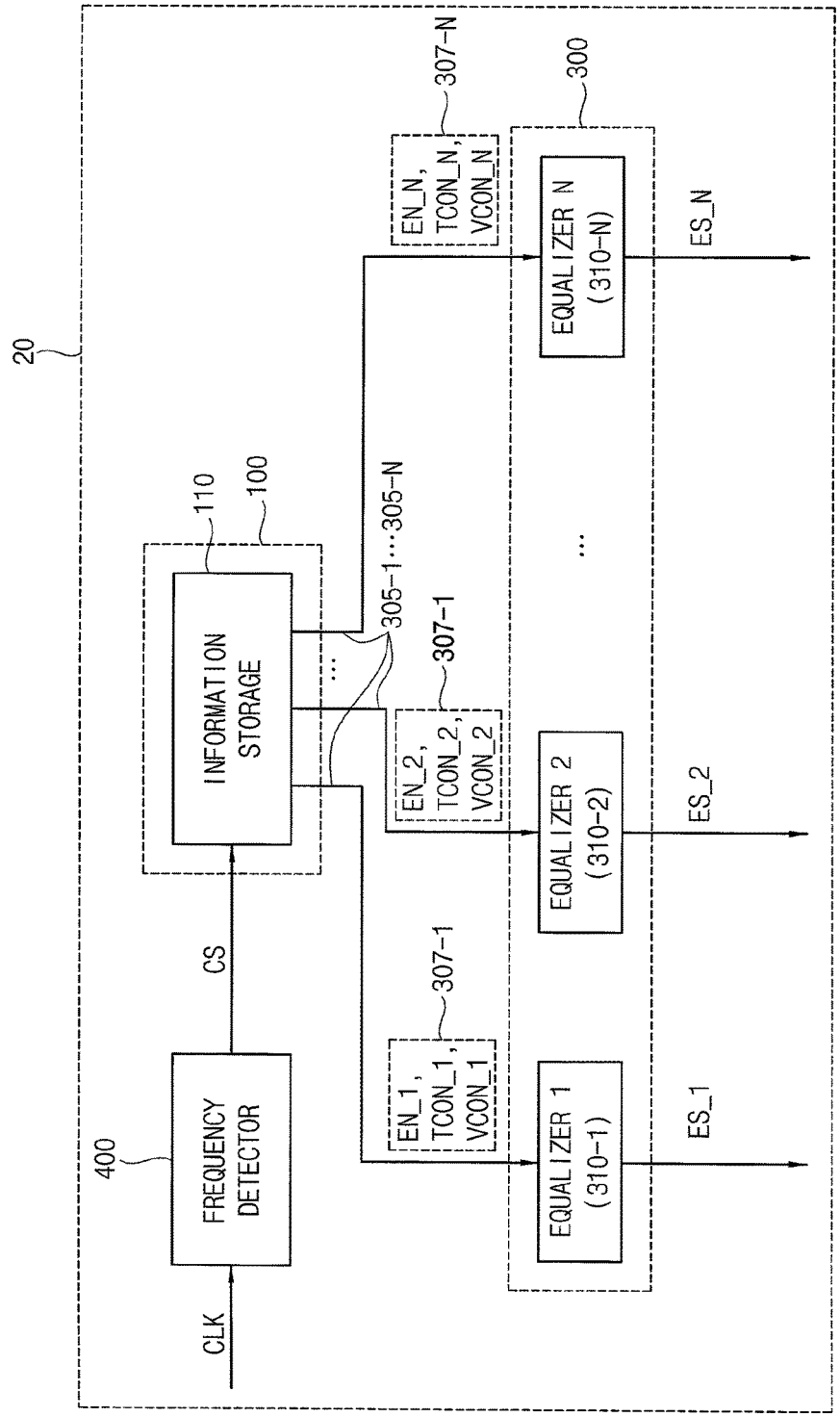
FIG. 9 is a block diagram illustrating an equalizer circuit according to some example embodiments.

FIG. 9 is a block diagram illustrating an equalizer circuit according to some example embodiments.

Referring to FIG. 9, an equalizer circuit 20 includes an equalizer controller 100, a plurality 300 of equalizers 310-1 to 310-N and a frequency detector 400.

The equalizer controller 100 may provide a plurality of enable signals EN_1 to EN_N, a plurality of delay control signals TCON_1 to TCON_N and a plurality of voltage control signals VCON_1 to VCON_N based on a control signal CS. The equalizers 300 may provide equalizer signals ES_1 to ES_N to connection nodes CN1 to CNN between the logic circuits 500 in FIG. 1 based on the enable signals EN_1 to EN_N, the delay control signals TCON_1 to TCON_N and the voltage control signals VCON_1 to VCON_N.

In comparison with the equalizer circuit 20 of FIG. 1, the equalizer circuit 20 of FIG. 9 further includes the frequency detector 400. The control signal CS may be provided from the frequency detector 400. The frequency detector 400 may detect a frequency of a clock signal CLK to provide the control signal CS including frequency information. The equalizer controller 100 may generate the enable signals EN_1 to EN_N, the delay control signals TCON_1 to TCON_N and the voltage control signals VCON_1 to VCON_N of the signal sets 307-1 to 307-N based on the control signal CS from the frequency detector 400.

In some example embodiments, the equalizer controller 100 may include an information storage 110 configured to store information of the enable signals EN_1 to EN_N, the delay control signals TCON_1 to TCON_N and the voltage control signals VCON_1 to VCON_N. For example, if and/or when the frequency of the clock signal CLK is about 100 MHz, the frequency detector 400 may provide the control signal CS corresponding to 100 MHz. The equalizer controller 100 may activate the first enable signal EN_1 and deactivate the second enable signal EN_2 in response to the control signal CS corresponding to 100 MHz. For example, when the frequency of the clock signal CLK is about 200 MHz, the frequency detector 400 may provide the control signal CS corresponding to 200 MHz. The equalizer controller 100 may activate both of the first enable signal EN_1 and the second enable signal EN_2 in response to the control signal CS corresponding to 200 MHz. The values for the enable signals EN_1 to EN_N, the delay control signals TCON_1 to TCON_N and the voltage control signals VCON_1 to VCON_N may be stored in the information storage 110 in advance based on the control signal CS.

The number of the equalizers 310-1 to 310-N that are enabled may be varied depending on the frequency of the clock signal CLK. For example, the number of the equalizers 310-1 to 310-N that are enabled may be increased as the frequency of the clock signal CLK is increased and the number of the equalizers 310-1 to 310-N that are enabled may be decreased as the frequency of the clock signal CLK is decreased. In other words, the number of the enable signals having the first logic level may be increased as the frequency of the clock signal CLK is increased, and the number of the enable signals having the second logic level may be increased as the frequency of the clock signal CLK is decreased. The number of the equalizers 310-1 to 310-N that are enabled may be increased as the frequency of the clock signal CLK and the input signal IN is increased.

As such, the equalizer circuit 20 according to some example embodiments may reduce the ISI effect by providing the equalizer signals ES_1 to ES_N to the connection nodes CN1 to CNN between the logic circuits based on the enable signals EN_1 to EN_N, the delay control signals TCON_1 to TCON_N and the voltage control signals VCON_1 to VCON_N.

Figure 10:
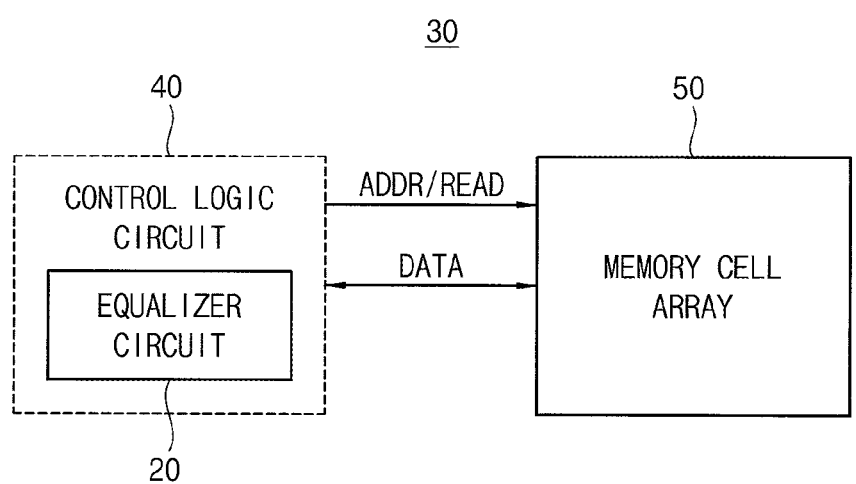
FIG. 10 is a block diagram illustrating a memory device according to some example embodiments.

FIG. 10 is a block diagram illustrating a memory device according to some example embodiments.

Referring to FIG. 1 and FIG. 10, a memory device 30 may include a control logic circuit 40 and a memory cell array 50. The control logic circuit 40 may provide an address ADDR, a control signal CTRL and write data to the memory cell array 50. The memory cell array may store the write data and provide read data based on the address ADDR and the control signal CTRL.

The control logic circuit 40 may include an equalizer circuit 20 as described with reference to FIGS. 1 through 9. The equalizer circuit 20 includes an equalizer controller 100, a plurality 300 of equalizers 310-1 to 310-N and a frequency detector 400. The equalizer controller 100 may provide a plurality of enable signals EN_1 to EN_N, a plurality of delay control signals TCON_1 to TCON_N and a plurality of voltage control signals VCON_1 to VCON_N based on a control signal CS. The equalizers 300 may provide equalizer signals ES_1 to ES_N to separate, respective connection nodes CN1 to CNN between separate pairs of the logic circuits 510-1 to 510-N in FIG. 1 based on the enable signals EN_1 to EN_N, the delay control signals TCON_1 to TCON_N and the voltage control signals VCON_1 to VCON_N. In some example embodiments, the equalizer circuit 20 may further include a frequency detector 400 configured to detect a frequency of a clock signal to provide the control signal CS including frequency information.

The equalizer circuit according to some example embodiments may reduce the ISI effect by providing the equalizer signals ES_1 to ES_N to the separate, respective connection nodes CN1 to CNN between the logic circuits in the memory device 30 based on the enable signals EN_1 to EN_N, the delay control signals TCON_1 to TCON_N and the voltage control signals VCON_1 to VCON_N.

Figure 11:
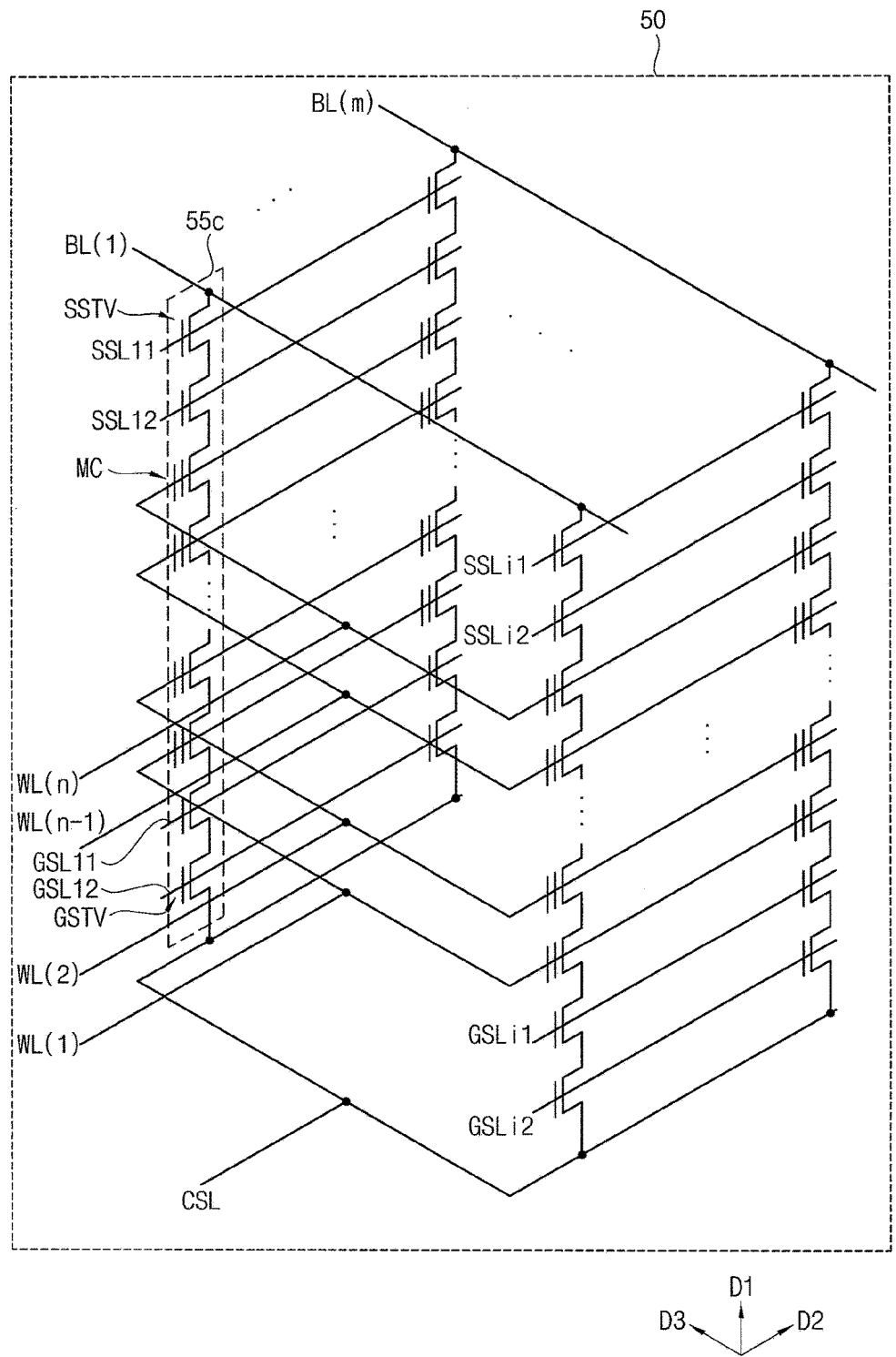
FIG. 11 is a diagram illustrating an example of a memory cell array included in the memory device of FIG. 10.

FIG. 11 is a diagram illustrating an example of a memory cell array 50 included in the memory device of FIG. 10.

Referring to FIG. 11, a memory cell array 50 may include multiple strings 55c having a vertical structure. The strings 55c are formed in a second direction D2 to form a string row. Multiple string rows are formed in a third direction D3 to form a string array. Each of strings 55c may include ground selection transistors GSTV, memory cells MC3, and string selection transistors SSTV, which are disposed in series in a first direction D1 between bit lines BL(1), . . . , BL(m) and common source line CSL.

The ground selection transistors GSTV are connected to ground selection lines GSL11, GSL12, . . . , GSLi1, GSLi2, respectively, and the string selection transistors SSTV are connected to string selection lines SSL11, SSL12, . . . , SSLi1, SSLi2, respectively. Memory cells MC disposed the same layer are connected in common to one of word lines WL(1), WL(2), . . . , WL(n−1), WL(n). The ground selection lines GSL11, . . . , GSLi2 and the string selection lines SSL11, . . . , SSLi2 extend in the second direction D2 and are formed along the third direction D3. The word lines WL(1), . . . , WL(n) extend in the second direction D2 and are formed along the first and third directions D1 and D3. The bit lines BL(1), . . . , BL(m) extend in the third direction D3 and are formed along the second direction D2. The memory cells MC are controlled according to a level of a voltage applied to the word lines WL(1), . . . , WL(n).

Because the vertical flash memory device including the memory cell array 50 includes NAND flash memory cells, like the NAND flash memory device, the vertical flash memory device performs the write and read operations in units of pages and the erase operation in units of block.

In some embodiments, two string selection transistors in one string 55c are connected to one string selection line and two ground selection transistors in one string are connected to one ground selection line. Further, according to some embodiments, one string comprises one string selection transistor and one ground selection transistor.

In an example embodiment, the memory cell array 50 may be a three dimensional memory array. In addition, in an embodiment of the present disclosure, a three dimensional (3D) memory array is provided in the memory device.

Figure 12:
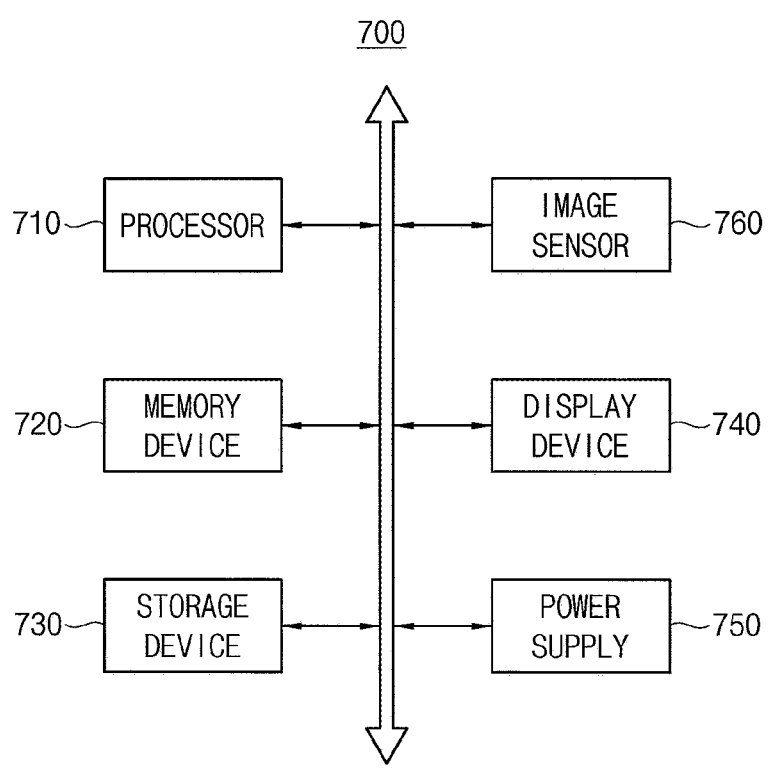
FIG. 12 is a block diagram illustrating a mobile device according to some example embodiments.

FIG. 12 is a block diagram illustrating a mobile device according to some example embodiments.

Referring to FIG. 12, a mobile system 700 may include a processor 710, a memory device 720, a storage device 730, a display device 740, a power supply 750 and an image sensor 760. The mobile system 700 may further include ports that communicate with a video card, a sound card, a memory card, a USB device, other electronic devices, etc.

The processor 710 may perform various calculations or tasks. According to embodiments, the processor 710 may be a microprocessor or a CPU. The processor 710 may communicate with the memory device 720, the storage device 730, and the display device 740 via an address bus, a control bus, and/or a data bus. In some embodiments, the processor 710 may be coupled to an extended bus, such as a peripheral component interconnection (PCI) bus. The memory device 720 may store data for operating the mobile system 700. For example, the memory device 720 may be implemented with a dynamic random access memory (DRAM) device, a mobile DRAM device, a static random access memory (SRAM) device, a phase-change random access memory (PRAM) device, a ferroelectric random access memory (FRAM) device, a resistive random access memory (RRAM) device, and/or a magnetic random access memory (MRAM) device. The memory device 720 includes the data loading circuit according to some example embodiments. The storage device 730 may include a solid state drive (SSD), a hard disk drive (HDD), a CD-ROM, etc. The mobile system 700 may further include an input device such as a touchscreen, a keyboard, a keypad, a mouse, etc., and an output device such as a printer, a display device, etc. The power supply 750 supplies operation voltages for the mobile system 700.

The image sensor 760 may communicate with the processor 710 via the buses or other communication links. The image sensor 760 may be integrated with the processor 710 in one chip, or the image sensor 760 and the processor 710 may be implemented as separate chips.

At least a portion of the mobile system 700 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP). The mobile system 700 may be a digital camera, a mobile phone, a smart phone, a portable multimedia player (PMP), a personal digital assistant (PDA), a computer, etc.

The mobile system 700 may be any of a variety of systems including an equalizer circuit according to some example embodiments. For example, the mobile system 700 may include a digital camera, a mobile phone, a smart phone, a portable multimedia player (PMP), a personal digital assistant (PDA), etc.

At least one of the processor 710, the memory device 720, the storage device 730, the display device 740, the power supply 750 and the image sensor 760 may include an equalizer circuit as described above. The equalizer circuit may reduce the ISI effect by providing the equalizer signals to the connection nodes between the logic circuits based on the control signals.

Figure 13:
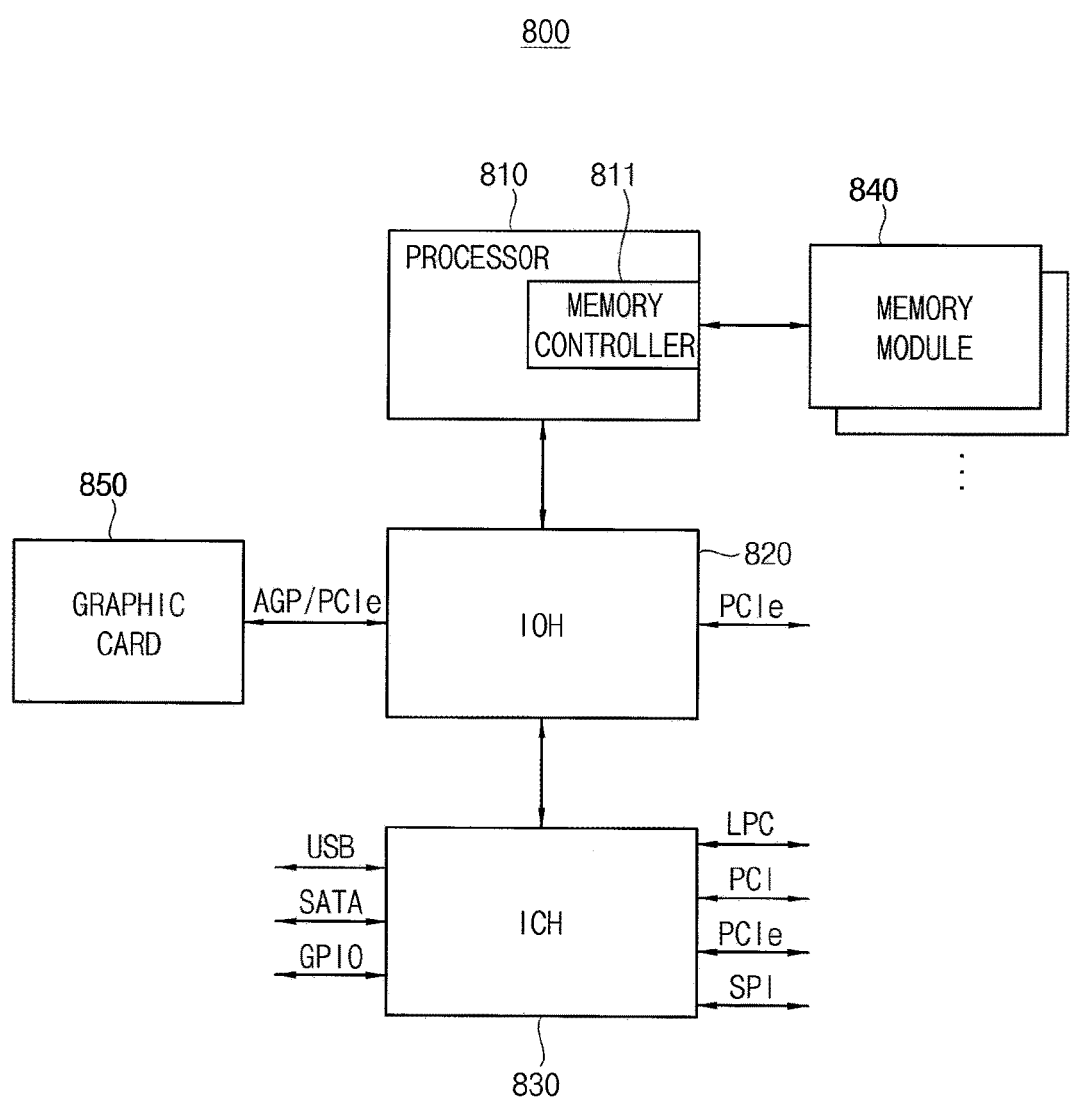
FIG. 13 is a block diagram illustrating a computing system according to some example embodiments.

FIG. 13 is a block diagram illustrating a computing system according to some example embodiments.

Referring to FIG. 13, a computing system 800 includes a processor 810, an input/output hub (IOH) 820, an input/output controller hub (ICH) 830, at least one memory module 840 and a graphics card 850. In some embodiments, the computing system 800 may be a personal computer (PC), a server computer, a workstation, a laptop computer, a mobile phone, a smart phone, a personal digital assistant (PDA), a portable multimedia player (PMP), a digital camera), a digital television, a set-top box, a music player, a portable game console, a navigation system, etc.

The processor 810 may perform various computing functions, such as executing specific software for performing specific calculations or tasks. For example, the processor 810 may be a microprocessor, a central process unit (CPU), a digital signal processor, or the like. In some embodiments, the processor 810 may include a single core or multiple cores. For example, the processor 810 may be a multi-core processor, such as a dual-core processor, a quad-core processor, a hexa-core processor, etc. Although FIG. 21 illustrates the computing system 800 including one processor 810, in some embodiments, the computing system 800 may include a plurality of processors. The processor 810 may include an internal or external cache memory.

The processor 810 may include a memory controller 811 for controlling operations of the memory module 840. The memory controller 811 included in the processor 810 may be referred to as an integrated memory controller (IMC). A memory interface between the memory controller 811 and the memory module 840 may be implemented with a single channel including a plurality of signal lines, or may bay be implemented with multiple channels, to each of which at least one memory module 840 may be coupled. In some embodiments, the memory controller 811 may be located inside the input/output hub 820, which may be referred to as memory controller hub (MCH).

The memory module 840 may include a plurality of memory devices that store data provided from the memory controller 811 and a buffer chip that manages overall operation of the memory devices. Each of the memory devices may store data processed by the CPU 710, or may operate as a working memory. Each of the memory devices may be a dynamic random access memory, such as DDR SDRAM, LPDDR SDRAM, GDDR SDRAM, RDRAM, etc. The buffer chip manages operation of the memory devices.

The input/output hub 820 may manage data transfer between processor 810 and devices, such as the graphics card 850. The input/output hub 820 may be coupled to the processor 810 via various interfaces. For example, the interface between the processor 810 and the input/output hub 820 may be a front side bus (FSB), a system bus, a HyperTransport, a lightning data transport (LDT), a QuickPath interconnect (QPI), a common system interface (CSI), etc. Although FIG. 21 illustrates the computing system 800 including one input/output hub 820, in some embodiments, the computing system 800 may include a plurality of input/output hubs. The input/output hub 820 may provide various interfaces with the devices. For example, the input/output hub 820 may provide an accelerated graphics port (AGP) interface, a peripheral component interface-express (PCIe), a communications streaming architecture (CSA) interface, etc.

The graphics card 850 may be coupled to the input/output hub 820 via AGP or PCIe. The graphics card 850 may control a display device (not illustrated) for displaying an image. The graphics card 850 may include an internal processor for processing image data and an internal memory device. In some embodiments, the input/output hub 820 may include an internal graphics device along with or instead of the graphics card 850 outside the graphics card 850. The graphics device included in the input/output hub 820 may be referred to as integrated graphics. Further, the input/output hub 820 including the internal memory controller and the internal graphics device may be referred to as a graphics and memory controller hub (GMCH).

The input/output controller hub 830 may perform data buffering and interface arbitration to efficiently operate various system interfaces. The input/output controller hub 830 may be coupled to the input/output hub 820 via an internal bus, such as a direct media interface (DMI), a hub interface, an enterprise Southbridge interface (ESI), PCIe, etc. The input/output controller hub 830 may provide various interfaces with peripheral devices. For example, the input/output controller hub 830 may provide a universal serial bus (USB) port, a serial advanced technology attachment (SATA) port, a general purpose input/output (GPIO), a low pin count (LPC) bus, a serial peripheral interface (SPI), PCI, PCIe, etc.

In some embodiments, the processor 810, the input/output hub 820 and the input/output controller hub 830 may be implemented as separate chipsets or separate integrated circuits. In other embodiments, at least two of the processor 810, the input/output hub 820 and the input/output controller hub 830 may be implemented as a single chipset.

At least one of the processor 810, the input/output hub (IOH) 820, the input/output controller hub (ICH) 830, the memory module 840 and the graphics card 850 may include an equalizer circuit as described above. The equalizer circuit may reduce the ISI effect by providing the equalizer signals to the connection nodes between the logic circuits based on the control signals.

The present disclosure may be applied to arbitrary devices and systems including an equalizer circuit for reducing the ISI effect. For example, the present disclosure may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An equalizer circuit comprising:
an equalizer controller configured to provide an enable signal, a delay control signal, and a voltage control signal based on a control signal; and
at least one equalizer configured to provide an equalizer signal based on the enable signal, the delay control signal and the voltage control signal, the at least one equalizer configured to provide the equalizer signal to a corresponding connection node, the corresponding connection node being connected to a corresponding logic circuit,
wherein the at least one equalizer includes,
a delay control circuit configured to delay a transfer signal from the corresponding logic circuit to provide a delayed transfer signal, the delay control circuit configured to delay the transfer signal based on the delay control signal, and
a voltage control circuit configured to provide the equalizer signal based on the delayed transfer signal and the voltage control signal,
wherein the voltage control circuit includes,
a voltage control inverter configured to provide the equalizer signal based on the delayed transfer signal.

2. The equalizer circuit of claim 1, wherein,
the delay control circuit includes,
a plurality of delay control inverters, each of the delay control inverters including a first terminal and a second terminal;
a PMOS delay control circuit, the PMOS delay control circuit including a plurality of PMOS delay control transistors, each of the PMOS delay control transistors being connected in parallel between a power supply voltage and separate first terminals of the plurality of delay control inverters; and
an NMOS delay control circuit, the NMOS delay control circuit including a plurality of NMOS delay control transistors, each of the NMOS delay control transistors being connected in parallel between a ground voltage and separate second terminals of the plurality of delay control inverters.

3. The equalizer circuit of claim 2, wherein,
the PMOS delay control circuit is configured to delay the transfer signal by a delay time based on PMOS delay gate signals applies to gates of the PMOS delay control transistors to selectively activate one or more of the PMOS delay control transistors, and
the PMOS delay control circuit is configured to control a magnitude of the delay time by controlling a quantity of the PMOS delay control transistors that are activated.

4. The equalizer circuit of claim 2, wherein,
the NMOS delay control circuit is configured to delay the transfer signal by a delay time based on NMOS delay gate signals applies to gates of the NMOS delay control transistors to selectively activate one or more of the NMOS delay control transistors, and
the NMOS delay control circuit is configured to control a magnitude of the delay time by controlling a quantity of the NMOS delay control transistors that are activated.

5. The equalizer circuit of claim 2, wherein the at least one equalizer is configured to be disabled based on an entirety of the PMOS delay control transistors and the NMOS delay control transistors included in the at least one equalizer being deactivated.

6. The equalizer of claim 5, wherein a quantity of the delay control inverters included in the at least one equalizer is an even integer.

7. The equalizer circuit of claim 1, wherein,
the voltage control circuit further includes,
a PMOS voltage control circuit, the PMOS voltage control circuit including a plurality of PMOS voltage control transistors, each of the PMOS voltage control transistors being connected in parallel between a power supply voltage and a first terminal of the voltage control inverter; and
an NMOS voltage control circuit, the NMOS voltage control circuit including a plurality of NMOS voltage control transistors, each of the NMOS voltage control transistors being connected in parallel between a ground voltage and a second terminal of the voltage control inverter.

8. The equalizer circuit of claim 7, wherein,
the PMOS voltage control circuit is configured to control the equalizer signal based on PMOS voltage gate signals applied to gates of the PMOS voltage control transistors to selectively activate one or more of the PMOS voltage control transistors, and
the PMOS voltage control circuit is configured to control a voltage of the equalizer signal by controlling a quantity of the PMOS voltage control transistors that are activated.

9. The equalizer circuit of claim 7, wherein,
the NMOS voltage control circuit is configured to control the equalizer signal based on NMOS voltage gate signals applied to gates of the NMOS voltage control transistors to selectively activate one or more of the NMOS voltage control transistors, and
the NMOS voltage control circuit is configured to control a magnitude of a voltage of the equalizer signal by controlling a quantity of the NMOS voltage control transistors that are activated.

10. The equalizer circuit of claim 1, further comprising:
a frequency detector configured to detect a frequency of a clock signal, the frequency detector further configured to control frequency information included in the control signal based on the frequency of the clock signal.

11. The equalizer circuit of claim 10, wherein the equalizer controller includes an information storage configured to store information indicating a value of at least one of enable signals, delay control signals and voltage control signals associated with at least one of a plurality of frequencies of clock signals.

12. The equalizer circuit of claim 11, further comprising:
a plurality of equalizer circuits;
wherein the equalizer controller is configured to control a quantity of the plurality of equalizer circuits that are enabled based on the frequency of the clock signal.

13. An integrated circuit, comprising:
a plurality of logic circuits; and
an equalizer circuit, the equalizer circuit including,
an equalizer controller configured to provide a plurality of signal sets based on a control signal, each signal set including a separate, respective set of enable signals, delay control signals, and voltage control signals; and
a plurality of equalizers, each of the equalizers being configured to provide a separate equalizer signal based on a separate set of enable signals, delay control signals, and voltage control signals, the equalizers being configured to provide the separate equalizer signals to separate, respective connection nodes based on the enable signals, each of the connection nodes being between a separate pair of the logic circuits,
wherein each equalizer of the plurality equalizers includes,
   a delay control circuit configured to delay a transfer signal from a corresponding logic circuit to provide a delayed transfer signal, the delay control circuit configured to delay the transfer signal based on a delay control signal, and
   a voltage control circuit configured to provide an equalizer signal based on the delayed transfer signal and a voltage control signal,
wherein the voltage control circuit includes,
   a voltage control inverter configured to provide the equalizer signal based on the delayed transfer signal.

14. The integrated circuit of claim 13, wherein,
the delay control circuit includes,
   a plurality of delay control inverters, each of the delay control inverters including a first terminal and a second terminal;
   a PMOS delay control circuit, the PMOS delay control circuit including a plurality of PMOS delay control transistors, each of the PMOS delay control transistors being connected in parallel between a power supply voltage and separate first terminals of the plurality of delay control inverters; and
   an NMOS delay control circuit, the NMOS delay control circuit including a plurality of NMOS delay control transistors, each of the NMOS delay control transistors being connected in parallel between a ground voltage and separate second terminals of the plurality of delay control inverters.

15. The equalizer circuit of claim 13, wherein the voltage control circuit further includes,
   a PMOS voltage control circuit, the PMOS voltage control circuit including a plurality of PMOS voltage control transistors, each of the PMOS voltage control transistors being connected in parallel between a power supply voltage and a first terminal of the voltage control inverter; and
   an NMOS voltage control circuit, the NMOS voltage control circuit including a plurality of NMOS voltage control transistors, each of the NMOS voltage control transistors being connected in parallel between a ground voltage and a second terminal of the voltage control inverter.

16. An equalizer, comprising: a delay control circuit configured to delay a received transfer signal to generate a delayed transfer signal, the delay control circuit configured to delay the transfer signal based on a received delay control signal; and a voltage control circuit configured to generate an equalizer signal based on the delayed transfer signal and a received voltage control signal, wherein the voltage control circuit includes, a voltage control inverter configured to provide the equalizer signal based on the delayed transfer signal, wherein the delay control circuit includes a plurality of delay control inverters, each of the delay control inverters including a first terminal and a second terminal, a PMOS delay control circuit, the PMOS delay control circuit including a plurality of PMOS delay control transistors, each of the PMOS delay control transistors being connected in parallel between a power supply voltage and separate first terminals of the plurality of delay control inverters, and an NMOS delay control circuit, the NMOS delay control circuit including a plurality of NMOS delay control transistors, each of the NMOS delay control transistors being connected in parallel between a ground voltage and separate second terminals of the plurality of delay control inverters, wherein the voltage control circuit further includes a PMOS voltage control circuit, the PMOS voltage control circuit including a plurality of PMOS voltage control transistors, each of the PMOS voltage control transistors being connected in parallel between the power supply voltage and a first terminal of the voltage control inverter; and an NMOS voltage control circuit, the NMOS voltage control circuit including a plurality of NMOS voltage control transistors,
   each of the NMOS voltage control transistors being connected in parallel between a ground voltage and a second terminal of the voltage control inverter.

17. The equalizer of claim 16, wherein,
the PMOS delay control circuit is configured to delay the transfer signal by a delay time based on PMOS delay gate signals applied to gates of the PMOS delay control transistors to selectively activate one or more of the PMOS delay control transistors, and
the PMOS delay control circuit is configured to control a magnitude of the delay time by controlling a quantity of the PMOS delay control transistors that are activated.

18. The equalizer of claim 16, wherein,
the NMOS delay control circuit is configured to delay the transfer signal by a delay time based on NMOS delay gate signals applied to gates of the NMOS delay control transistors to selectively activate one or more of the NMOS delay control transistors, and
the NMOS delay control circuit is configured to control a magnitude of the delay time by controlling a quantity of the NMOS delay control transistors that are activated.

\* \* \* \* \*